United States Patent
Qian et al.

(10) Patent No.: US 8,051,446 B1
(45) Date of Patent: Nov. 1, 2011

(54) METHOD OF CREATING A SEMANTIC VIDEO SUMMARY USING INFORMATION FROM SECONDARY SOURCES

(75) Inventors: Richard Qian, Camas, WA (US); Peter J. L. Van Beek, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1826 days.

(21) Appl. No.: 09/455,964

(22) Filed: Dec. 6, 1999

(51) Int. Cl.
*H04N 5/445* (2011.01)
*H04N 7/173* (2011.01)
*G06F 3/00* (2006.01)

(52) U.S. Cl. ............ 725/39; 725/41; 725/52; 725/109; 725/110; 715/719; 715/723

(58) Field of Classification Search .............. 725/39, 725/51, 53, 112, 109, 110, 41, 52; 715/719, 715/723
See application file for complete search history.

(56) References Cited

U.S. PATENT DOCUMENTS

| | | |
|---|---|---|
| D348,251 S | 6/1994 | Hendricks |
| D354,059 S | 1/1995 | Hendricks |
| 5,434,678 A | 7/1995 | Abecassis |
| D368,263 S | 3/1996 | Hendricks |
| 5,524,193 A * | 6/1996 | Covington et al. ........... 715/512 |
| 5,559,549 A | 9/1996 | Hendricks et al. |
| 5,589,945 A | 12/1996 | Abecassis |
| 5,600,364 A | 2/1997 | Hendricks et al. |
| 5,600,573 A | 2/1997 | Hendricks et al. |
| 5,606,655 A | 2/1997 | Arman et al. ................. 395/140 |
| 5,610,653 A | 3/1997 | Abecassis |
| 5,634,849 A | 6/1997 | Abecassis |
| 5,635,982 A | 6/1997 | Zhang et al. .................. 348/231 |
| D381,991 S | 8/1997 | Hendricks |
| 5,659,350 A | 8/1997 | Hendricks et al. |
| 5,664,046 A | 9/1997 | Abecassis |
| 5,664,227 A | 9/1997 | Mauldin et al. ............... 395/778 |
| 5,682,195 A | 10/1997 | Hendricks et al. |
| 5,684,918 A | 11/1997 | Abecassis |
| 5,696,869 A | 12/1997 | Abecassis |
| 5,708,767 A | 1/1998 | Yeo et al. |
| 5,710,884 A | 1/1998 | Dedrick |
| 5,717,814 A | 2/1998 | Abecassis |
| 5,724,472 A | 3/1998 | Abecassis |

(Continued)

FOREIGN PATENT DOCUMENTS

EP    0 848 554 A2 *   6/1998

(Continued)

OTHER PUBLICATIONS

Video Visualization for Compact Presentation and Fast Browsing of Pictorial Content.

(Continued)

*Primary Examiner* — Son P Huynh
(74) *Attorney, Agent, or Firm* — Chernoff Vilhauer McClung & Stenzel LLP

(57) ABSTRACT

Creating semantic summaries and abstractions of video requires high level knowledge of the domain of the video. Obtaining this high level information without human intervention is problematic. A method of producing video summaries and abstractions is provided where high level knowledge necessary for meaningful summarization is obtained from existing sources such as the worldwide web or an electronic programming guide. With this information, the summarization system can automatically identify significant events or subjects and extract video related to these events or subjects.

12 Claims, 2 Drawing Sheets

U.S. PATENT DOCUMENTS

| | | | |
|---|---|---|---|
| 5,732,146 A | 3/1998 | Yamada et al. | 382/107 |
| 5,734,853 A | 3/1998 | Hendricks et al. | |
| 5,761,881 A | 6/1998 | Wall | |
| 5,774,357 A | 6/1998 | Hoffberg et al. | |
| 5,774,664 A | 6/1998 | Hidary et al. | |
| 5,778,181 A | 7/1998 | Hidary et al. | 395/200.48 |
| 5,797,001 A | 8/1998 | Augenbraun et al. | |
| 5,798,785 A | 8/1998 | Hendricks et al. | |
| D402,310 S | 12/1998 | Hendricks | |
| 5,867,386 A | 2/1999 | Hoffberg et al. | |
| 5,875,108 A | 2/1999 | Hoffberg et al. | |
| 5,884,056 A * | 3/1999 | Steele | 345/738 |
| 5,892,536 A | 4/1999 | Logan et al. | |
| 5,900,867 A | 5/1999 | Schindler et al. | |
| 5,901,246 A | 5/1999 | Hoffberg et al. | |
| 5,903,314 A * | 5/1999 | Niijima et al. | 725/44 |
| 5,903,454 A | 5/1999 | Hoffberg et al. | |
| 5,907,323 A * | 5/1999 | Lawler et al. | 345/327 |
| 5,913,013 A | 6/1999 | Abecassis | |
| 5,920,477 A | 7/1999 | Hoffberg et al. | |
| 5,926,624 A | 7/1999 | Katz et al. | |
| 5,929,849 A * | 7/1999 | Kikinis | 345/327 |
| 5,958,006 A | 9/1999 | Eggleston et al. | |
| 5,973,683 A | 10/1999 | Cragun et al. | |
| 5,986,690 A | 11/1999 | Hendricks | |
| 5,986,692 A | 11/1999 | Logan et al. | |
| 5,987,211 A | 11/1999 | Abecassis | |
| 5,990,927 A | 11/1999 | Hendricks et al. | |
| 6,002,394 A * | 12/1999 | Schein et al. | 345/327 |
| 6,002,833 A | 12/1999 | Abecassis | |
| 6,005,565 A * | 12/1999 | Legall et al. | 345/327 |
| 6,011,895 A | 1/2000 | Abecassis | |
| 6,038,367 A | 3/2000 | Abecassis | |
| 6,052,554 A | 4/2000 | Hendricks et al. | |
| 6,061,056 A * | 5/2000 | Menard et al. | 715/704 |
| 6,067,401 A | 5/2000 | Abecassis | |
| 6,072,934 A | 6/2000 | Abecassis | |
| 6,081,750 A | 6/2000 | Hoffberg et al. | |
| 6,088,455 A | 7/2000 | Logan et al. | |
| 6,091,886 A | 7/2000 | Abecassis | |
| RE36,801 E | 8/2000 | Logan et al. | |
| 6,111,614 A * | 8/2000 | Mugura et al. | 348/569 |
| 6,144,375 A * | 11/2000 | Jain et al. | 715/500.1 |
| 6,151,444 A | 11/2000 | Abecassis | |
| D435,561 S | 12/2000 | Pettigrew et al. | |
| 6,160,989 A | 12/2000 | Hendricks et al. | |
| 6,177,931 B1 * | 1/2001 | Alexander et al. | 345/327 |
| 6,181,335 B1 | 1/2001 | Hendricks et al. | |
| 6,184,877 B1 * | 2/2001 | Dodson et al. | 725/110 |
| 6,201,536 B1 | 3/2001 | Hendricks et al. | |
| 6,208,805 B1 | 3/2001 | Abecassis | |
| 6,215,526 B1 | 4/2001 | Barton et al. | |
| 6,219,837 B1 * | 4/2001 | Yeo et al. | 725/38 |
| 6,230,501 B1 | 5/2001 | Bailey, Sr. et al. | |
| 6,233,389 B1 | 5/2001 | Barton et al. | |
| 6,236,395 B1 * | 5/2001 | Sezan et al. | 345/328 |
| 6,240,555 B1 * | 5/2001 | Shoff et al. | 725/110 |
| 6,252,544 B1 | 6/2001 | Hoffberg | |
| 6,268,849 B1 * | 7/2001 | Boyer et al. | 345/327 |
| 6,269,216 B1 | 7/2001 | Abecassis | |
| 6,289,165 B1 | 9/2001 | Abecassis | |
| 6,295,092 B1 * | 9/2001 | Hullinger et al. | 348/468 |
| 6,304,715 B1 | 10/2001 | Abecassis | |
| 6,317,885 B1 * | 11/2001 | Fries | 725/109 |
| 6,326,982 B1 * | 12/2001 | Wu et al. | 715/718 |
| 6,351,270 B1 * | 2/2002 | Nishikawa et al. | 345/717 |
| 6,522,342 B1 * | 2/2003 | Gagnon et al. | 345/716 |
| 6,536,041 B1 * | 3/2003 | Knudson et al. | 725/39 |
| 6,567,980 B1 * | 5/2003 | Jain et al. | 725/61 |
| 6,637,032 B1 * | 10/2003 | Feinleib | 725/110 |
| 2003/0066085 A1 * | 4/2003 | Boyer et al. | 725/104 |
| 2005/0028194 A1 * | 2/2005 | Elenbaas et al. | 725/32 |

FOREIGN PATENT DOCUMENTS

| | | |
|---|---|---|
| JP | 11-032267 | 2/1999 |
| JP | 11-261908 | 9/1999 |
| JP | 2000-013755 | 1/2000 |
| WO | WO 99/65237 | 12/1999 |

OTHER PUBLICATIONS

Video Skimming for Quick Browsing Based on Audio and Image Characterization.

Content-Based Video Browsing Tools.

Alan Hanjalic, Marco Ceccarelli, Reginald L. Lagendijk, Jan Biemond., *Automation of Systems Enabling Search on Stored Video Data*; Delft University of Technology, The Netherlands. SPIE—The International Society for Optical Engineering, *Storage and Retrieval for Image and Video Databases V*; vol. 3022, pp. 427-438.

Eric H.J. Person, SMASH—A Concept for advanced use of storage in the home, IMAGINA '98, Monaco, also available at: http://www-it.et.tudelft.nl/htm/research/SMASH/publicc/imagina98/p.804-7_1.htm.

* cited by examiner

Latest Market News

- TOKYO STOCKS - Factors to watch - August 17 - Sun 7:32 pm
- WALL ST WEEK AHEAD - Clinton sideshow to global woes - Sun 6:24pm
- IPO VIEW - Delay may hurt tech deals this week - Sun 6:23pm
- DAOU accounting raises question - Barrons - Sun 5:53pm
- Analyst sees Conoco as a good for Elf and DuPont - Sun 5:36pm
- TransFinancial fends off takeover bid - Sun 4:17pm
- Cabot Industrial Trust files for offering - Sun 3:19pm
- DuPont declines comment on Conoco report - Sun 2:27pm
- Global turmoil seen keeping U.S. rates steady - Sun 11:55am
- Clinton expected to admit to improper relationship - Sun 10:23am
- Riding the Toronto market not for weak hearted - Sun 10:08am

FIG. 3

METHOD OF CREATING A SEMANTIC VIDEO SUMMARY USING INFORMATION FROM SECONDARY SOURCES

BACKGROUND OF THE INVENTION

The present invention relates to a method of summarizing or abstracting video and, more particularly, a method for using information related to video obtained from a source other than the video to create an audio-video semantic summary of video.

The dramatic increase in the quantity of available video, a trend which is expected to continue or accelerate, has increased the need for an automated means of summarizing video. A summary of a video could be viewed as a preview to, or in lieu of, viewing the complete, unabridged video. Summarization could also be used as a basis for filtering large quantities of available video to create a video abstraction related to a specific subject of interest. However, to be most beneficial the summary or abstraction should be semantically significant, capturing major events and meaning from the video.

There are three broad classes of techniques for creating video summaries. A first class of techniques produces a linear summary of a video sequence. A linear summary comprises a collection of key frames extracted from the video. Groups of similar frames or shots are located in the video sequence, and one or more key frames are selected from each shot to represent the content of the shot. Shot boundary detection and selection of key frames within a shot are based on lower level video analysis techniques, such as frame to frame variation in color distribution or temporal positioning of a frame in a shot. While the creation of linear summaries can be automated, the extraction of a linear summary is not event driven and may only capture a rough abstraction of the video. Linear summaries are useful for video sequences where events are not well defined, such as home video, but are not well suited to producing meaningful summaries of videos containing well defined events, such as videos of sporting events.

A second summary extraction technique produces a video story board. The story board is a graphic presentation of the video comprising a number of nodes and edges. Nodes are created by grouping shots usually on the basis of some low level visual characteristic, such as a color histogram. The edges describe relationships between the nodes and are created by human interaction with the summarizing system. While story boarding can produce meaningful summaries, it relies on human intervention to do so.

A third summary extraction technique involves the creation of semantic video summaries which requires an understanding of the events in the video and, in many cases, some expertise of the domain or subject area portrayed by the video. Obtaining this understanding and expertise through automated means has, heretofore, been problematic. Smith et al., VIDEO SKIMMING FOR QUICK BROWSING BASED ON AUDIO AND IMAGE CHARACTERIZATION, Carnegie-Mellon University Tech Report, CMU-CS-95-186, 1995, utilizes detection of keywords in the audio track or closed captioning accompanying a video as a basis for locating meaningful video segments. However, it is difficult to select appropriate keywords and the selected keywords may be uttered many times as part of some general commentary related to the subject of the video without necessarily signaling the presence of corresponding meaningful visual images.

What is desired, therefore, is a method of creating meaningful event driven video summaries that minimizes the necessity for human intervention in the summarizing process.

SUMMARY OF THE INVENTION

In a first aspect, the present invention overcomes the aforementioned drawbacks of the prior art by providing a method of creating a semantic summary of a video comprising the steps of identifying a domain of the video; using the domain identity to locate information related to the video at a source other than the video; extracting data from the information; and extracting content from the video related to the data. The domain or sphere of activity of the video can be identified from an electronic programming guide or other indexing means. With the domain identity known, the summarizing system can link to a worldwide web site or an electronic programming guide containing statistics or other summary information about events of the video. In this way, the system can obtain the high level knowledge about the progress of events in the video to permit the system to identify content corresponding to significant events. Thus, although the summarizing information was created for other purposes it can be used to assemble a semantic summary of the video.

In a second aspect of the invention, a method of abstracting video is provided comprising the steps of locating an index of the video; identifying a domain of a video abstraction; using the domain identity to identify in the index video for inclusion in the abstraction; and extracting the identified video. An index of a video collection is located in an electronic programming guide, on the worldwide web or otherwise. When the domain of the particular abstraction is identified, the domain's identity can be used as a basis for searching the collection for video relevant to the desired abstraction.

The method of the present invention provides the high level domain knowledge necessary for creating semantic summaries and abstractions by locating the knowledge for event recognition and detection in existing sources without the need for additional human intervention.

The foregoing and other objectives, features and advantages of the invention will be more readily understood upon consideration of the following detailed description of the invention, taken in conjunction with the accompanying drawings.

BRIEF DESCRIPTION OF THE DRAWINGS

FIG. 3 is an exemplary video index containing programming information related to headline news.

DETAILED DESCRIPTION OF THE PREFERRED EMBODIMENT

Figures 1, 2:
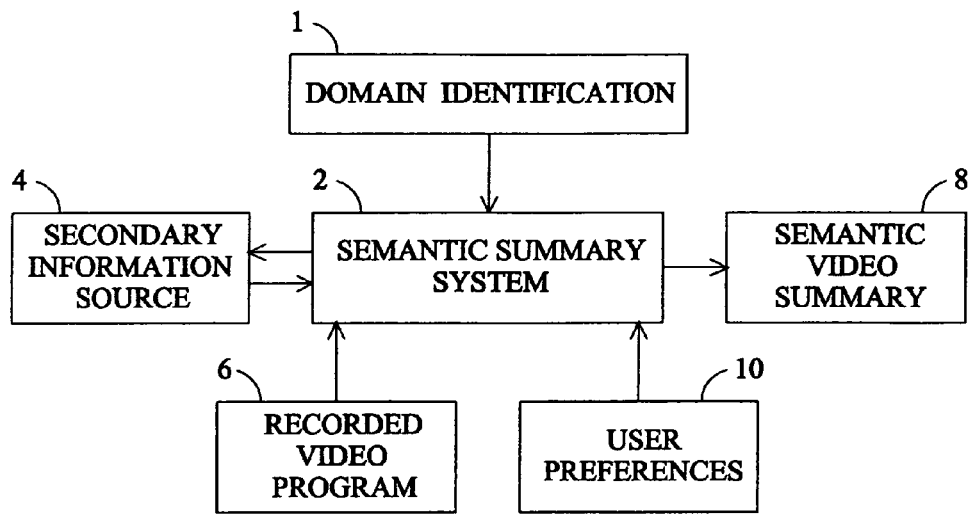
FIG. 1 is a block diagram of the summarization and abstraction system of the present invention.
FIG. 2 is an exemplary worldwide web page containing information related to a sporting event.

Creation of a semantically significant summary of video footage generally requires the ability to recognize and detect events and objects in the visual images, together with some high-level knowledge of the domain or sphere of activity of the video upon which to base the inference of the occurrence of an event in the video. For example, providing a meaningful summary of a sporting event requires knowledge concerning the progress of events in the game to permit the summarizing system to detect significant plays, such as scoring attempts, and the capability to locate and extract a visual representation of the detected event. While computer vision techniques are increasingly capable of object recognition and detection, event recognition requires a higher level of understanding of the progress of events than computers have been capable of achieving by processing video.

The inability of automated techniques to develop a sufficient understanding of events in the domain of a video, in such a manner as to enable detection of events, is a significant problem in automating the creation of semantically significant video summaries. While this remains a problem, the present inventors realized that there are automatically accessible sources of information separate from the video itself that index or summarize events in the domain of many videos. Further, even though this information was created for other purposes, it may be used for creating semantic summaries or abstractions of video. The method of creating a semantic video summary of the present invention uses available information from sources other than the video, such as worldwide-web sites, an electronic programming guide, or other sources, to aid in event inference and detection to create meaningful summaries.

Referring to FIG. 1, the summarization method of the present invention first identifies a domain 1 or sphere of activity in which a semantic summary system 2 will operate. Higher level domains include sports, news, movies, etc. These domains may be further divided into more specific subject areas, such as basketball, soccer, football, etc. The identity of the domain of a broadcast video may be extracted from an electronic programming guide that lists television programming and content for viewers. Other indexing systems related to video may also be used to identify the domain. Based on the identification of the domain, the summarizing system 2 links to a secondary source of information 4, such as a worldwide web site, which includes statistical, summary, or other indexing information related to the events which are the subject of the video 6. Many worldwide web sites include statistics, summary information, or commentary related to sports activities, news, or movies. Much of the information at worldwide web sites is in the form of textual summaries. Using optical character recognition, parsing of hypertext markup language (HTML) code or other known techniques, the summarization system 2 extracts information that is semantically significant to the video 6.

For example, FIG. 2 illustrates an exemplary textual summary related to a soccer game posted on a worldwide web site. From such a textual summary the video summarization system 2 can extract information, such as names and times of events, and identification of subjects (e.g., names and uniform numbers of players). Using the data obtained from the summary, the summarization system 2 can pinpoint a number of shots from the video 6 around the times of the scoring events for inclusion in the video summary 8. On the other hand, the system might use object detection and optical character recognition to locate the specific players to further pinpoint video content corresponding to the events identified in the textual summary described at the secondary source of information 4. The summarization system 2 permits a user to enter preferences 10 related to the summary 8 to be created. For example, a user might instruct the system to search out events related to a particular individual or subject.

The summarization system 2 can also be used to create an abstraction of a video collection. Utilizing indexing information for the video collection extracted from the secondary source of information 4 and a domain for the video abstraction 1 provided by a user, the summarization system 2 can search video footage 6 that may be stored in a home file system or filter broadcast video to identify portions of the video matching events or subjects in the requested domain. For example, the summarization system 2 can extract information related to source, story title, names of subjects, or times of events from a site summarizing televised news programming.

FIG. 3 illustrates an exemplary textural index of broadcast news events. If the user wishes to review video footage related to "DuPont," a keyword search by the summarization system of such a news index at a worldwide web site or in an electronic programming guide would locate two relevant news events. From this information the system 2 can direct the recording of the appropriate videos for an abstraction 8 of the news programming for eventual presentation to the viewer. Existing audio or visual information from a secondary source 4, such as a web site, may also be down loaded from the secondary source 4 and matched to the video segments obtained from broadcast media.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

What is claimed is:

1. A method of creating a semantic summary of a video comprising the steps of:
    (a) identifying a domain of said video;
    (b) using said domain to locate information related to said video at a source other than said video;
    (c) extracting a datum related to a semantic event from said information, said semantic event describing a portion of said video;
    (d) identifying said portion of said video related to said datum; and
    (e) creating a summary of said identified portion of said video in response to the extraction of said datum.

2. The method of claim 1 wherein said information is a textual summary of events.

3. The method of claim 1 wherein said information is included in a worldwide web site.

4. The method of claim 1 wherein said information is included in an electronic programming guide.

5. The method of claim 1 wherein said domain is identified from an electronic programming guide.

6. The method of claim 1 further comprising the step of displaying said summary to a user.

7. A method of abstracting video comprising the steps of:
    (a) locating an index of said video from a source external to said video;
    (b) identifying a domain of said video for creating a video abstraction;
    (c) using said domain together with said index to identify portions of said video for inclusion in said video abstraction;
    (d) extracting said identified portions of said video from said video to form said video abstraction in response to the location of said index; and
    (e) displaying said video abstraction to a user.

8. The method of claim 7 wherein said index is included in a worldwide web site.

9. The method of claim 7 wherein said index is included in an electronic programming guide.

10. The method of claim 7 further comprising the step of identification of said domain by a user of said abstraction.

11. A method of creating a semantic summary of a video comprising the steps of:
(a) identifying a domain of said video;
(b) using said domain to locate a textual summary of said video;
(c) extracting a datum related to a semantic event relevant to said video summary from said textual summary;
(d) locating content in said video corresponding to said datum; and
(e) extracting said content related to said semantic event from said video in response to extraction of said datum from said video for inclusion in said semantic summary including at least one portion of said video.

12. A method of abstracting video comprising the steps of:
(a) locating an index of said video in at least one of a worldwide web site and a programming guide;
(b) identification of a domain of said video for creating a video abstraction by a user;
(c) using said domain together with said index to identify portions of said video for inclusion in said video abstraction; and
(d) extracting said identified portions of said video from said video to form said video abstraction.

* * * * *